J. B. O'CONNOR AND L. TARWATER.
SECTIONAL PNEUMATIC TIRE.
APPLICATION FILED JAN. 17, 1917.

1,330,815.

Patented Feb. 17, 1920.

Witness:
R. L. Hamilton

Inventors:
J. B. O'Connor and
L. Tarwater.
By Chas. W. Gerard,
Attorney.

UNITED STATES PATENT OFFICE.

JAMES B. O'CONNOR AND LAWSON TARWATER, OF KANSAS CITY, MISSOURI.

SECTIONAL PNEUMATIC TIRE.

1,330,815.      Specification of Letters Patent.      Patented Feb. 17, 1920.

Application filed January 17, 1917. Serial No. 142,948.

*To all whom it may concern:*

Be it known that we, JAMES B. O'CONNOR and LAWSON TARWATER, citizens of the United States, residing at Kansas City, in the county of Jackson and State of Missouri, have invented certain new and useful Improvements in Sectional Pneumatic Tires, of which the following is a full and exact specification.

The present invention relates to resilient wheels and aims to provide an improved sectional pneumatic tire construction for the treads of such wheels. Accordingly, one of the objects of the invention is to produce an improved pneumatic tread comprising a series of independently secured casings, each having its own individual inflatable element.

It is also an object to provide a sectional pneumatic tire construction comprising separately inclosed inflatable elements, together with individual demountable rim sections for independently securing the tire sections to the wheel.

It is a further object to devise improved securing means for attaching a sectional tire construction of the proposed type to the wheel proper.

It is also sought to produce a simple, strong and economical construction of pneumatic tread, which will be easy to assemble or repair and not readily gotten out of order. Minor objects will appear in the course of the detailed description.

With these general objects in view, the invention will now be described with reference to the accompanying drawing illustrating one form of embodiment of the improvements, after which those features and combinations deemed to be novel will be set forth and defined in the appended claims.

In the drawing—

Figure 1:
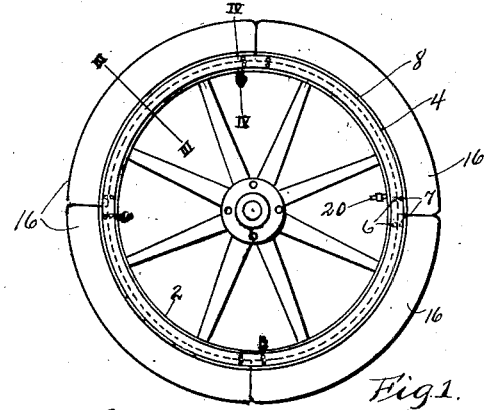
Figure 1 shows a side elevation of a resilient wheel having the present improvements applied thereto.

Referring to the drawing in detail, this illustrates a resilient wheel of ordinary construction with the exception of the features of the rim and tire as they enter into the present improvements. The opposite sides of the felly 2 of the wheel are provided with a pair of rim securing rings 4 secured by screws 6 to the felly, and similar screws 7 are employed for securing the series of rim sections 8 in place between the ring members 4 to the outer face of the felly 2.

Figure 5:
Fig. 5 is a plan view of one of the rim sections.
Figure 2:
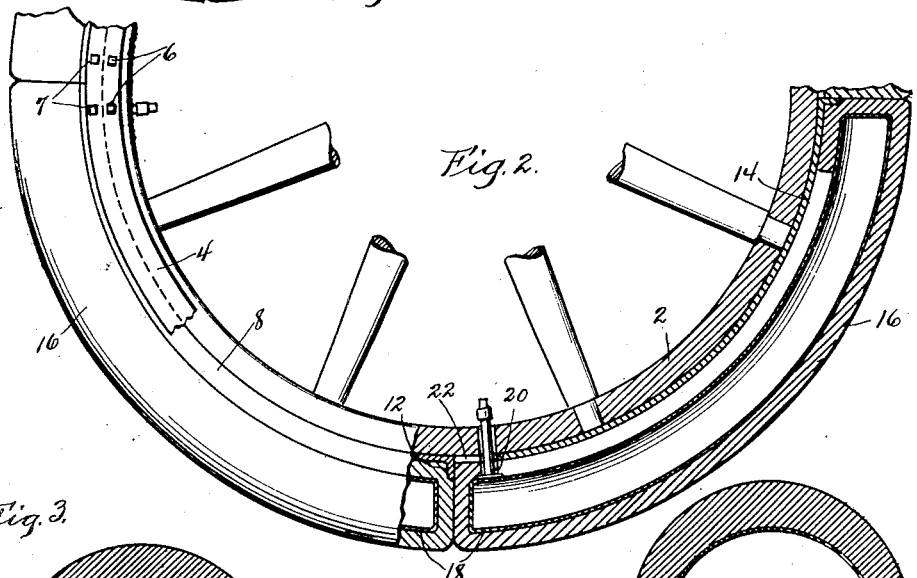
Fig. 2 is a side elevation of the same on an enlarged scale, partly broken away and in section.
Figure 3:
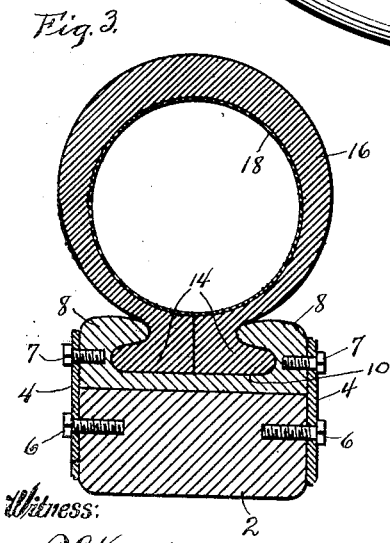
Figs. 3 and 4 are transverse sections, on a still larger scale, taken on the lines III—III and IV—IV, respectively, of Fig. 1.
Figure 4:
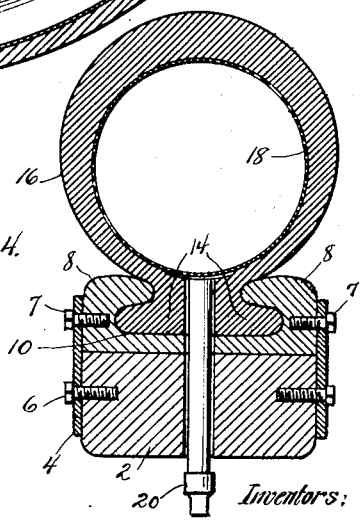

The outer face of each rim section 8 is formed with a T-shaped groove 10 which is closed at one end, as at 12 (see Figs. 2 and 5). The opposite end of each groove 10 is open and the shape of the groove is such as to accommodate the beaded portions 14 of the corresponding outer tire casings 16 and clamping said beaded portions within the groove in the manner illustrated in Figs. 3 and 4. The tire is formed in sections equal in number to the number of rim sections, preferably four or more, the construction outlined in the drawing showing four, each section forming a quadrant.

Each outer casing 16 is provided with its own individual inflatable or pneumatic tube 18 having the valve stem and valve 20 at one of its ends for inflating the tube, and the casing 16 with its tube 18 fitted therein is attached to the corresponding rim section 18 by inserting the beaded portions 14 into the groove 10 by way of the open end thereof until one end of the casing comes into engagement with the closed end portion 12, the opposite end of the groove being formed with a notch 22 for accommodating the valve stem 20 of the tube 18. When the sections of the tire are assembled and the parts all applied to the wheel in proper position, the arrangement of the rim and tire sections is such that the closed end portions 12 of the rim sections serve to close up the open ends of the grooves 10 of the next adjacent rim section (see Fig. 2), thereby confining the bead portions of each tire section to the groove of its own particular rim section.

With the construction of tire as above described, it will be apparent that in the event of tire trouble, such as a puncture or defect in the tire at any portion thereof, the trouble and expense of making a repair is greatly simplified, since it is only necessary to remove the defective portion and repair or replace the same, without disturbing any of the remaining portion of the tire. The sections are detached by simply unfastening the screws 7 at the opposite ends of the particular rim section involved, when the latter may at once be lifted away from between the ring members 4 of the wheel, and the parts of the removed section may be separated by relative movement thereof along the groove 10. It will also be noted that no jacking of the wheel off the ground is necessary, since the wheel need only be brought to rest with the section of tire to be repaired occupying the upper portion of the wheel so as to permit ready and convenient access thereto.

While the foregoing represents what is now deemed to constitute the preferred form of embodiment of the improvements, the right is reserved to all such formal changes and modifications as may fairly fall within the scope of the appended claims.

Claims:

1. In a resilient wheel construction, a series of tire sections arranged in end abutting relation to form a complete annulus, said sections being formed with bead securing portions, and a demountable rim section associated with each of said tire sections and formed with a T-shaped groove open at one end and closed at the other for slidingly receiving said bead portions of the tire sections and holding the same in clamped relation, said rim sections being arranged so that the open end of each groove is closed by the closed end of the next adjoining section.

2. In a resilient wheel construction, a series of outer tire casings arranged in end abutting relation, an inner tube inclosed by each of said casings and provided at one end with a valve stem for inflating the same, said casings being formed with bead securing portions, and a demountable rim section associated with each of said casings and formed with a T-shaped groove open at one end and closed at the other for slidably receiving said bead portions of the casings and holding the same in clamped relation, each of said sections being formed with a notch at the open end of its groove for receiving the valve stem of the corresponding inner tube and the sections being arranged so that the open end of each groove is closed by the closed end of the next adjoining section.

In testimony whereof we hereto affix our signatures.

JAMES B. O'CONNOP.
LAWSON TARWATER.